United States Patent
Giordani (10) Patent No.: US 12,377,702 B2
(45) Date of Patent: Aug. 5, 2025

(54) ACTIVE SHOCK ABSORBER DEVICE FOR A MOTOR VEHICLE WITH INTEGRATED CONTROL UNIT

(71) Applicant: FERRARI S.P.A., Modena (IT)

(72) Inventor: Mauro Giordani, Modena (IT)

(73) Assignee: FERRARI S.P.A., Modena (IT)

( * ) Notice: Subject to any disclaimer, the term of this patent is extended or adjusted under 35 U.S.C. 154(b) by 96 days.

(21) Appl. No.: 18/303,773

(22) Filed: Apr. 20, 2023

(65) Prior Publication Data
US 2023/0347703 A1 Nov. 2, 2023

(30) Foreign Application Priority Data
Apr. 27, 2022 (IT) .......................... 102022000008252

(51) Int. Cl.
*B60G 17/06* (2006.01)
*B60G 15/02* (2006.01)
*B60G 17/015* (2006.01)

(52) U.S. Cl.
CPC ............. *B60G 17/06* (2013.01); *B60G 15/02* (2013.01); *B60G 17/0152* (2013.01);
(Continued)

(58) Field of Classification Search
CPC .......... B60G 2500/10; B60G 2202/422; B60G 2202/312; B60G 17/0152; B60G 15/02; B60G 17/06
See application file for complete search history.

(56) References Cited

U.S. PATENT DOCUMENTS

| | | | |
|---|---|---|---|
| 5,064,031 A | 11/1991 | Kakizaki | |
| 7,722,056 B2 * | 5/2010 | Inoue | B60G 17/06 280/6.154 |

(Continued)

FOREIGN PATENT DOCUMENTS

| | | | | |
|---|---|---|---|---|
| KR | 20160026837 A | * | 3/2016 | |
| WO | WO-2016122337 A1 | * | 8/2016 | ......... B60G 17/0157 |

OTHER PUBLICATIONS

Italian Search Report for Application No. 102022000008252; Filing Date: Apr. 27, 2022; Date of Mailing—Dec. 12, 2022, 8 pages.

*Primary Examiner* — Paul N Dickson
*Assistant Examiner* — Maxwell L Meshaka
(74) *Attorney, Agent, or Firm* — CANTOR COLBURN LLP (57) ABSTRACT

A shock absorber device for a motor vehicle includes a spring support, a spring, a damping device configured to exert a damping force, a control unit, an electric motor electrically connected to the control unit and controllable by the control unit through a power supply signal emitted by the control unit, such that the electric motor provides a torque or a force corresponding to the power supply signal, and conversion means configured to control the damping device turning the torque or force outputted into a further force corresponding to the torque or force outputted and exerted by means of the damping device, wherein the control unit is configured to receive a first control signal indicative of a target value for the further force and to provide the power supply signal as a function of the first control signal, such that the power supply signal corresponds to the target value for the further force, the control unit being coupled to the spring support in a fixed position relative to the spring support.

13 Claims, 4 Drawing Sheets

(52) U.S. Cl.
  CPC .. *B60G 2202/312* (2013.01); *B60G 2202/422* (2013.01); *B60G 2500/10* (2013.01)

(56) References Cited

U.S. PATENT DOCUMENTS

| | | | | |
|---|---|---|---|---|
| 7,766,350 | B2* | 8/2010 | Terada | B62D 5/0418 |
| | | | | 280/86.757 |
| 9,732,823 | B2* | 8/2017 | Kato | B60G 17/06 |
| 10,773,566 | B2* | 9/2020 | Bakker | B60G 17/08 |
| 2008/0157497 | A1* | 7/2008 | Terada | B60G 7/006 |
| | | | | 280/124.1 |
| 2009/0079145 | A1* | 3/2009 | Inoue | B60G 15/063 |
| | | | | 267/140.14 |
| 2014/0260233 | A1* | 9/2014 | Giovanardi | F16K 11/065 |
| | | | | 60/431 |
| 2014/0288776 | A1* | 9/2014 | Anderson | F16F 9/064 |
| | | | | 701/37 |
| 2015/0224845 | A1* | 8/2015 | Anderson | F03G 7/08 |
| | | | | 701/37 |
| 2016/0001621 | A1* | 1/2016 | Kato | B60G 17/06 |
| | | | | 188/267 |
| 2019/0375260 | A1* | 12/2019 | Bakker | B60G 17/019 |
| 2020/0062067 | A1 | 2/2020 | Anderson et al. | |
| 2022/0055434 | A1* | 2/2022 | Hansen | B60G 7/001 |
| 2023/0347703 | A1* | 11/2023 | Giordani | B60G 17/06 |

\* cited by examiner

ACTIVE SHOCK ABSORBER DEVICE FOR A MOTOR VEHICLE WITH INTEGRATED CONTROL UNIT

CROSS-REFERENCE TO RELATED APPLICATIONS

This patent application claims priority from Italian patent application no. 102022000008252 filed on Apr. 27, 2022, the entire disclosure of which is incorporated herein by reference.

TECHNICAL FIELD

The invention concerns an active shock absorber device for a motor vehicle, in particular a sports car.

PRIOR ART

As known, the body of a motor vehicle is normally suspended in relation to the wheels via suspension devices. Each of the suspension devices usually includes a shock absorber device, in turn including a spring and a damper, for example a helical spring and a damper or shock absorber, for example a gas one, more precisely of the double-cylinder (bi-tube) type or single-cylinder (single tube) type or with remote hydraulic valves and gas tank.

The hydraulic damper has an external casing and a shaft with a piston that is axially mobile in relation to the external casing. An axial end of the shaft and the external casing are, respectively, fixed to the body and to an element of the suspension device, for example a suspension arm. In this way, the movement of the shaft in relation to the external casing corresponds to a movement of the body in relation to the suspension arm.

The suspension arm follows, though not necessarily rigidly, a movement of the wheel to which it is coupled. Therefore, the movement of the wheel caused by the contact with the road surface is transmitted to the suspension arm with the result of a relative movement of the shaft in relation to the external casing fixed to the suspension arm.

During the relative movement of the shaft, the piston cooperates with a fluid wherein the piston is immersed inside the external casing, thus damping the movement of the shaft itself.

Similarly, the helical spring has two axial ends respectively fixed to the body and to the suspension arm. In this way, the movement of the body in relation to the suspension arm corresponds to an extension or elastic compression of the spring.

For example, the spring may be coaxial to the shaft.

In some cases, the shock absorber device may be an active one, i.e., comprising a control apparatus or, more precisely, an apparatus for generating a force configured to actively control the movement of the body in relation to the suspension arm, in particular generating and controlling a force applied to the body, independently of the movement imposed on the wheels by the road surface and transmitted to the body via the suspension devices.

The control apparatus may be of various types; for example, some control apparatuses pertinent to shock absorber devices, so-called adaptive ones, control the damping offered by the shock absorber device, regulating the fluid-dynamic cooperation of the piston with the fluid inside the external casing. Other, purely active control apparatuses pertinent to shock absorber devices directly impose a controlled movement on the body relative to the suspension arm via servoactuators, for example, electric, hydraulic, pneumatic, or electro-hydraulic ones.

One example of an adaptive shock absorber device may be that wherein the piston comprises continuously adjustable spool valves to adjust the flow of fluid through the piston during the movement of the shaft. The spool valves are electrically driven, i.e., by means of an electric motor, for example an electric stepper motor. Clearly, adjusting the obstruction of the flow via the spool valves directly influences the damping of the shaft's movement, but does not generate, in itself, the movement of the shaft.

One example of a purely active shock absorber device may be that including a hydraulic actuator for moving the shaft or the body in relation to the suspension arm, wherein the internal pressure is adjusted via a hydraulic machine, for example a pump, driven by an electric motor.

One preferred example of a purely active shock absorber device may be that wherein the electric motor directly drives the shaft through a transmission, in particular comprising a succession of gears, a chain or belt, or wherein the electric motor moves the body in relation to the suspension arm.

Of course, the shock absorber device may also include any combination of the above-mentioned technologies, so that, for example, the shock absorber device may include the hydraulic actuator and the spool valves on the piston or the spool valves on the piston and the electric motor driving the shaft via the transmission.

In any case, the active shock absorber device, whether adaptive or purely active, comprises at least one motor for delivering torque or a force, based on the type of motor, and an adjustment device configured to use the torque or the force delivered by the motor to adjust a force applied to the shaft or, more generally, exerted by the shock absorber device, i.e., more precisely to adjust or at least influence the movement of the shaft.

The force applied or exerted may be a damping force, i.e., a force countering movement of the shaft, or an actuating force, i.e., a force synchronising with the movement of the shaft.

The torque or force delivered by the motor, on which the damping force or the applied actuating force depends, is controlled via electric signals coming from a control unit of the motor vehicle, for example, as a function of the quantities detected by transducers and indicating a pace of the motor vehicle.

In some cases, the motor may be electric and, in more detail, be controlled or supplied via high-voltage electric signals, i.e., electric signals with a voltage greater than or equal to 36 volts, more preferably greater than or equal to 48 volts.

In these cases, there is a need to improve the safety and/or the configuration of the electrical connections or components, in particular focusing on dimensions.

One purpose of this invention is to satisfy the need described above, preferably in a simple and reliable way.

DESCRIPTION OF THE INVENTION

The purpose is achieved with a shock absorber device as defined in claim 1.

The dependent claims define particular embodiments of the invention.

BRIEF DESCRIPTION OF THE DRAWINGS

Below, an embodiment of the invention will be described to better understand the same by way of non-limiting example and with reference to the attached drawings in which.

EMBODIMENTS OF THE INVENTION

Figure 1:
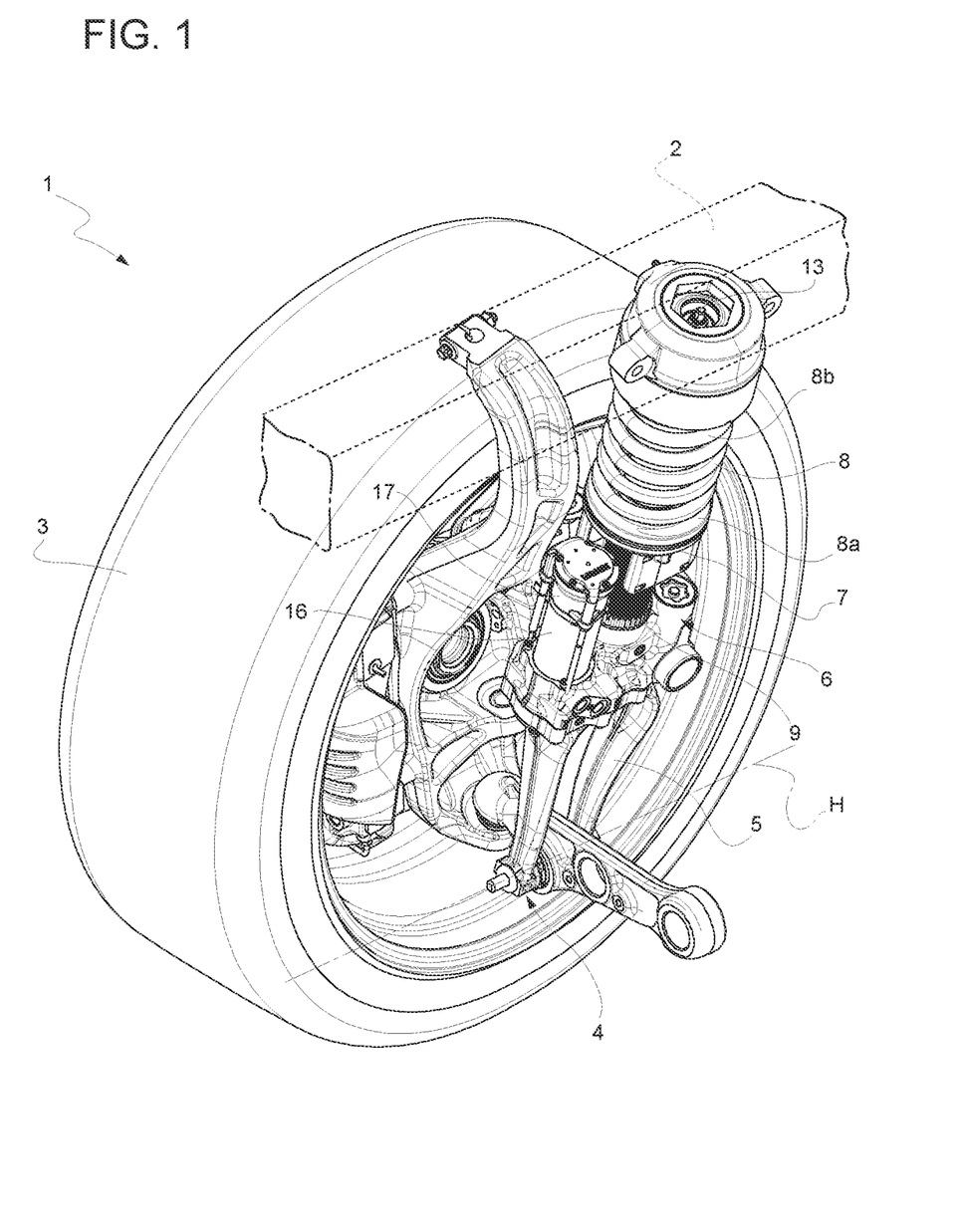
FIG. 1 is a schematic perspective view of a portion of a motor vehicle comprising a shock absorber device according to the invention.

In FIG. 1, the reference number 1 is used to indicate, as a whole, a motor vehicle.

Like all motor vehicles, the motor vehicle 1 has a body 2, i.e., a structural assembly including a frame and a bodywork, and at least one wheel 3 coupled to the body 2.

The body 2 defines or surrounds the passenger compartment of the motor vehicle 1.

The motor vehicle 1 also comprises a suspension 4, through which the wheel 3 is coupled to the body 2.

As known, the suspension 4 comprises multiple suspension elements coupled to the wheel 3, including a suspension arm 5 illustrated in FIG. 1.

The wheel 3 defines an unsuspended mass of the motor vehicle 1, i.e., a body arranged in direct contact with the road; therefore, during the travel of the motor vehicle 1, the wheel 3 moves as a function of the features of the road with which it is in contact.

The movements of the wheel 3 are transmitted to the suspension elements since the latter are coupled to the wheel 3. In other words, the suspension elements move as a function of the movements of the wheel 3.

In detail, the arm 5 rotates around an axis H, so that the movements of the wheel 3 may cause corresponding rotations of the arm 5. Thus, in general, the suspension elements may have movements relative to the wheel 3, although this is not, generally, necessary.

The motor vehicle 1 also comprises a shock absorber device or assembly 6 that is part of the suspension 4; the shock absorber device 6 is configured to suspend the body 2 in relation to one of the suspension elements, in particular in relation to the arm 5.

Thus, the body 2 defines a mass suspended by the shock absorber device 6 relative to the unsuspended mass.

Thanks to the shock absorber device 6, the body 2 may have a movement relative to the wheel 3, while being coupled to it via the same shock absorber device 6 and the arm 5. The shock absorber device 6 reacts to the relative movements between the body 2 and the wheel 3 exerting a force countering a force acting on the wheel 3 due to the contact between the wheel 3 and the road, so that a force resulting from the overlapping of the other two forces mentioned and having, conveniently, a reduced modulus compared to the force acting on the wheel 3 is actually transmitted to the body 2. The force exerted by the shock absorber device 6 is preferably such as to brake the relative movement of the body 2 compared to the wheel 3, dissipating energy, for example as a result of an impact between the wheel 3 and the road or of a transfer of the load of the motor vehicle 1, for example, occurring when the motor vehicle 1 takes a curve, or during acceleration or braking of the motor vehicle 1; in this way, the movements of the wheel 3 are not transmitted to the body 2 with a medium or high frequency.

In other words, the movements of the wheel 3 are only partially transmitted, or in a dampened way, to the body 2.

Figure 2:
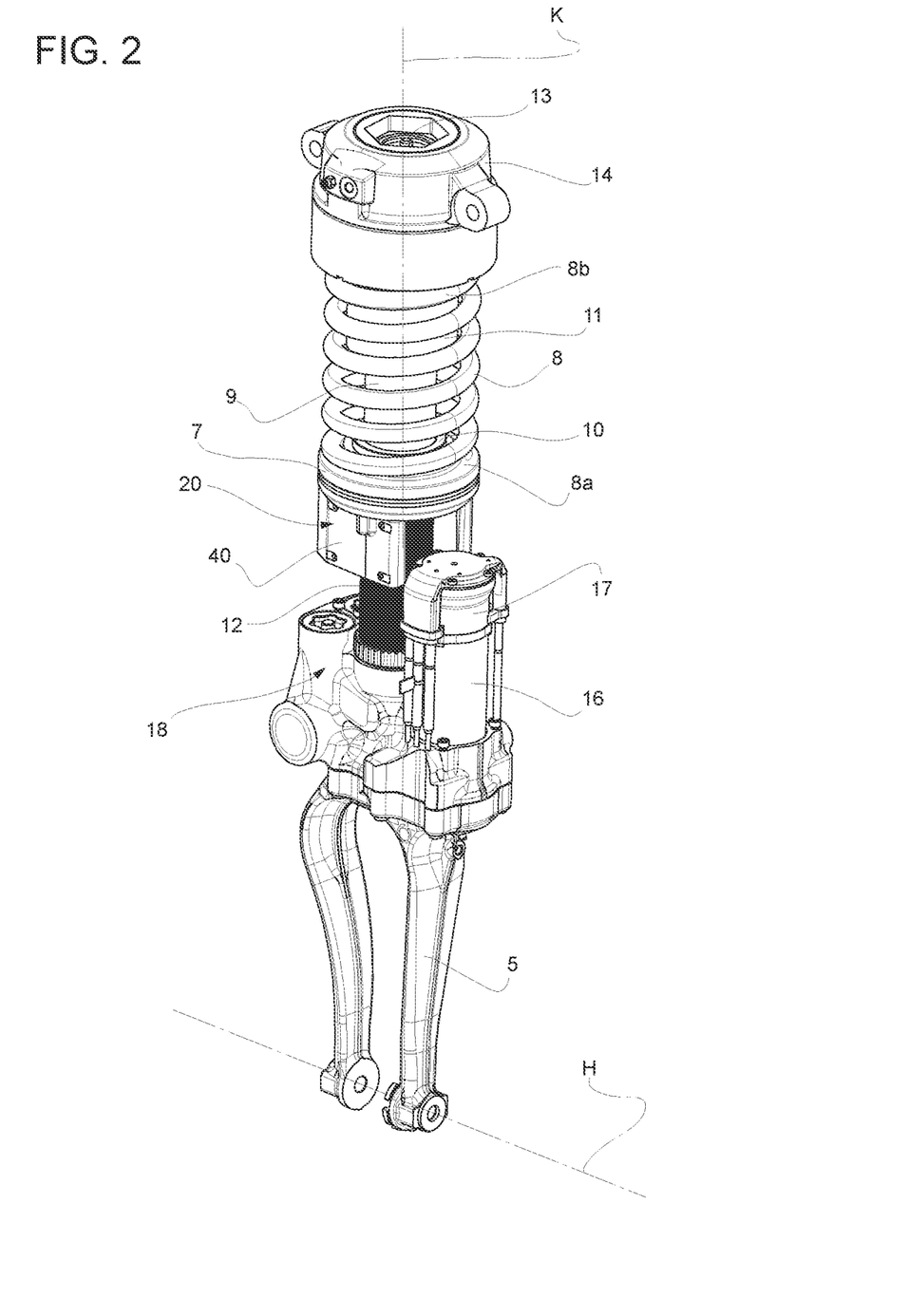
FIG. 2 is a perspective view, on an enlarged scale, of the shock absorber device in FIG. 1.

The shock absorber device 6 comprises a spring support 7, a spring 8, and a shock absorber or damping device 9.

The spring 8 suspends the body 2 in relation to one of the suspension elements, in particular in relation to the arm 5. The damper 9 performs the function of dissipating energy.

The spring 8 may be, for example, a metallic spring, in particular a helical spring, or a fluid spring without any loss of generality.

The spring 8 has an axis K, i.e., it extends axially along the axis K. The spring 8 extends axially between two ends 8a, 8b, respectively fixed to the spring support 7 and to the body 2. In particular, the end 8a is directly fixed to the spring support 7. The end 8b may be fixed to the body 2 indirectly, as appears in FIG. 1 and as will be detailed below.

The damping device 9 is configured to at least damp the movement of the wheel 3, more precisely relative to the body 2, exerting a damping force in response to the movement of the wheel 3.

Clearly, the damping force corresponds to a relative force exerted on the body 2 or on the wheel 3, in particular according to classical mechanics, more specifically Eulerian mechanics.

As will be clearer from below, the damping device 9 may also be used to exert an actuating force, i.e., to amplify or increase the movement of the wheel 3 relative to the body 2, for example by distancing the body 2 from the wheel 3, or even to generate or impose the movement of the wheel 3 in relation to the body 2.

In other words, the damping device 9 may be part of a purely active shock absorber device.

Of course, even the actuating force corresponds to a relative force exerted on the body 2 or on the wheel 3, in particular according to classical mechanics, more specifically Eulerian mechanics.

The damping device 9 comprises an external casing 10 extending axially between two ends 11, 12, of which the end 12 is fixed to one of the suspension elements, specifically the arm 5, in particular directly.

The casing 10 is, more specifically, cylindrical.

In addition, in detail, the casing 10 extends around the axis K, i.e., along the axis K.

Therefore, the spring 8 is coaxial with the casing 10 or with the damping device 9. More precisely, the spring 8 is arranged around the casing 10 or the damping device 9.

Inside the casing 10, the damping device 9 comprises, in detail, an internal cylinder not illustrated and completely filled with a fluid, in particular a liquid, more specifically an oil.

The damping device 9 comprises, in addition, a shaft 13 and a piston not illustrated and fixed to the shaft 13 at one intermediate portion of the shaft 13. The shaft 13 is arranged along the axis K and can slide along the axis K in relation to the casing 10 inside the latter.

The piston is configured to cooperate with the fluid in the internal cylinder. An axial movement of the shaft 13 corresponds, thus, to an interaction between the piston and the fluid. The interaction produces the damping force countering the axial movement of the shaft 13.

The damping device 9 also comprises an attachment element 14 fixed to one end of the shaft 13; the attachment element 14 has a portion arranged between the shaft 13 and the body 2 and is fixed to the body 2, in particular using threaded elements not illustrated.

Since the attachment element 14 is fixed to the shaft 13, the axial movement of the shaft 13 corresponds to an axial movement of the attachment element 14 and, thus, to an axial movement of the body 2. The shaft 13 moves axially in relation to the casing 10 and, thus, in relation to the suspension element or arm 5. Thus, the body 2 moves axially in relation to the suspension element or arm 5 in response to the axial movement of the shaft 13.

The end 8b of the spring 8 is fixed to the attachment element 14, in particular directly. The spring 8 extends along the axis K between the spring support 7 and the attachment element 14. Thus, the end 8b is indirectly fixed to the body 2 via the attachment element 14.

The axial movement of the attachment element 14 corresponding to the axial movement of the shaft 13 entails an extension or compression of the spring 8, which consequently reacts elastically.

The spring support 7 is fixed relative to the casing 10. More precisely, the spring support 7 is fixed to the casing 10 at one intermediate portion of the casing 10 between the ends 11, 12.

In detail, the spring support 7 has a through hole along the axis K. The casing 10 completely traverses the spring support 7 via the through hole along the axis K. In other words, the casing 10 extends along the axis K through the through hole.

When the motor vehicle 1 moves, the movements of the wheel 3 are transmitted to the arm 5; the movement of the arm 5 causes a relative axial movement between the shaft 13 and the casing 10. The latter relative movement causes the production of the damping force as mentioned above. The body 2 moves rigidly together with the shaft 13, in particular via the attachment element 14 fixing the body 2 to the shaft 13 indirectly. Thus, the damping force corresponds to a relative movement between the arm 5 and the body 2 coupled via the shock absorber device 6.

The shock absorber device 6 also comprises an electric motor 16, in particular an AC electric motor, for example an asynchronous motor. More precisely, the alternating current that supplies the electric motor 16 is a three-phase current, in particular with a nominal supply voltage between 36 and 52 volts, more specifically equal to 48 volts.

As known, the electric motor 16 may also function as a generator.

The electric motor 16 is configured to output a torque or force, for example in its operation as motor, i.e., when it is supplied with electric current.

The electric motor 16 has at least one stator portion 17 that is fixed relative to the casing 10.

The shock absorber device 6 comprises a conversion or regulation or drive assembly 18 configured to use the torque or force provided by the electric motor 16 transforming it into a force exerted by or via the damping device 9, i.e., in other words to drive the damping device 9 so that the latter produces a force associated with or corresponding to the torque or the force provided by the motor.

The force exerted via the damping device 9 is, in particular, an axial force, i.e., a force directed along the axis K.

The force exerted via the damping device 9 may be a damping force or an actuating force.

The damping force or the actuating force corresponds to a force exerted on the body 2 or on the wheel 3 via the damping device 9.

The conversion assembly 18 produces the damping or drive force, as a function of the or in response to the torque or force provided by the electric motor 16. In practice, the conversion assembly 18 controls the damping device 9 using the torque or force provided by the electric motor 16, so that the damping or actuating force is exerted in correspondence with the torque or force provided.

In other words, the conversion assembly 18 establishes a relation, in this case unique, between the torque or the force provided and the force exerted by the damping device 9.

In particular, the conversion assembly 18 transforms the torque or force provided by the electric motor 16 into a force applied to the shaft 13 and, more particularly, directed along the axis K. The latter force on the shaft 13 may be the damping force, i.e., directed in contrast to the movement of the shaft 13, or the actuating force, i.e., directed concordant with the movement of the shaft 13.

In practice, the conversion assembly 18 applies or transfers the torque or force provided by the electric motor 16 onto the shaft 13.

The conversion assembly 18 may actually be produced in many ways, some already known.

According to a first example, the conversion assembly 18 comprises a transmission configured to transfer the torque or force provided by the electric motor 16 to the shaft 13 mechanically, so that the shaft 13 moves axially in response to the torque or force provided by the electric motor 16. For example, the transmission includes at least one mechanism for converting the rotary movement outputted by the electric motor 16 into a translating movement, such as a screw-nut mechanism or a mechanism with coupling between a worm screw and a helical wheel. The transmission confers the translating movement to the shaft 13, so that the shaft 13 translates along the axis K.

According to another example, the conversion assembly 18 comprises one or more servo valves and a hydraulic machine, for example a pump, driven using the electric motor 16, potentially by means of suitable transmissions. The pump is configured to supply liquid to the servo valves using at least one portion of the torque or force provided by the electric motor 16. The servo valves are controlled via the electric motor 16 and configured to distribute the liquid provided by the pump upstream and/or downstream of the piston inside the casing 10. Therefore, the servo valves and the pump define a system configured to change the pressure of the fluid inside the casing 10 upstream and/or downstream of the piston, so that the force along the axis K acting on the piston varies as a result. In this way, by adjusting the pressure upstream and/or downstream of the piston, the conversion assembly 18 applies the damping or actuating force coinciding with the force acting on the piston and, as a result, on the shaft 13.

According to a third example, the conversion assembly 18 comprises one or more servo valves coupled to the piston and configured to enable the liquid inside the casing 10 to traverse the piston according to an adjustable flow via the servo valves. The servo valves can be adjusted using the electric motor 16. In particular, the servo valves have multiple openings and mobile shutters to adjust the blocking of the openings. The electric motor 16 is configured to move the mobile shutters via the torque or force provided by the electric motor 16 and transmitted to the mobile shutters via a suitable mechanical transmission, thus adjusting the degree to which the openings are blocked. The blocking of the openings determines the flow of liquid through the piston. The flow of liquid, in turn, determines the damping force acting on the piston and, thus, on the shaft 13 as a result.

According to a fourth example, the conversion assembly 18 comprises a mechanical transmission configured to transmit the torque or force provided by the electric motor 16 to the body 2 directly. In other words, the mechanical transmission supplied with the torque or force provided by the electric motor 16 moves the body 2 in relation to the suspension element or arm 5, causing a relative movement of the body 2 in relation to the suspension element or arm 5. In this case, the conversion assembly 18 indirectly controls the damping device 9 since the latter responds to the relative movement of the body 2 in relation to the suspension element or arm 5 with the damping force as a function of the torque or force provided by the electric motor 16.

Similarly, according to a fifth example similar to the fourth example, the mechanical transmission of the fourth example may be configured to move the spring support 7 and, as a result, the casing 10 in relation to the body 2. Moving the spring support 7, the arm 5 also moves towards the body 2.

Clearly, a person skilled in the art will be able to derive additional examples for the conversion assembly 18, for example by combining all or some of the examples mentioned above. The combination may also occur by just overlapping the features of each of the examples mentioned above.

In general, as can be understood from the above explanations, the damping or actuating force is a direct consequence of the torque or force provided by the electric motor 16 and is, therefore, dependent on the torque or force provided.

The actuating force or the damping force is directed, in this case, according to the axis K.

Figure 3:
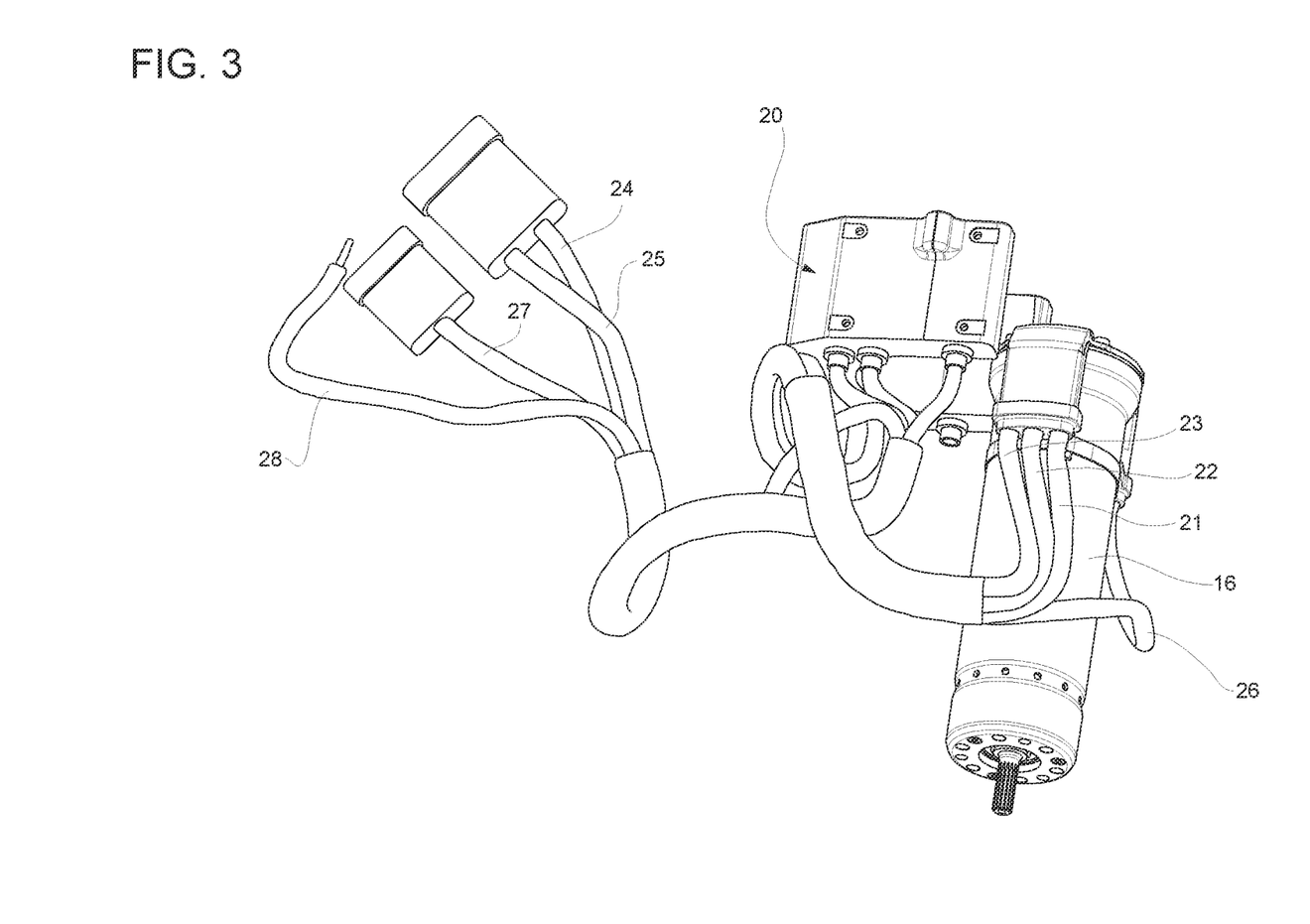
FIG. 3 is an additional, perspective view of the shock absorber device with its wiring.

To control the electric motor 16, the shock absorber device 6 comprises a control unit 20 electrically connected to the electric motor 16, in particular via multiple wires 21, 22, 23, 26.

The control unit 20 is integrated with the shock absorber device 6.

The wires 21, 22, 23 represent, in detail, the three phases of the current suitable for supplying the electric motor 16.

The wire 26, independently of the other wires 21, 22, 23, may represent a wire to convey a feedback signal to control, in a closed loop, the output speed from the electric motor 16 in response to the current to supply the electric motor 16.

In particular, the feedback signal corresponds to a quantity detected and indicating the output speed from the electric motor 16.

The electric motor 16 can be controlled by the control unit 20 via a power supply signal emitted by the control unit 20.

In detail, the power supply signal is the electric current that supplies the electric motor 16, i.e., the current directed by the control unit 20 to the electric motor 20 through the wires 21, 22, 23.

The torque or force provided by the electric motor 16 is the direct result of the power supply signal received by the electric motor 16. In other words, the torque or the force delivered corresponds to the power supply signal or is a function of the power supply signal.

The control unit 20 is configured to emit the power supply signal as a function of a control signal coming from another control unit, for example that is part of the motor vehicle 1, and indicating a target value for the damping or actuating force.

The target value may be an individual value, for example associated with a current moment, or variable over time, i.e., a temporal succession of target values.

The control unit 20 is configured to receive the control signal, for example via a wire 27, in detail that is part of a CAN 12V network.

In detail, the wire 27 connects one control unit 20 with the other control unit of the motor vehicle 1.

The control unit 20 is, additionally, electrically connected to the motor vehicle 1 via supply wires 24 and 25. The supply wire 24 comes, in particular, from a power source or is attached to the power source, for example a battery or volt generator 48. The wire 25 is a grounded wire.

In other words, the control unit 20 comprises an electrical connection to receive an electrical supply current. The electrical supply current, in particular a direct current, may, in particular, have a voltage between 36 and 52 volts, preferably 48 volts.

The target value of the damping or actuating force is preferably determined by the other control unit as a function of signals acquired via transducers and indicating parameters characterising the movement of the motor vehicle 1 in use. The actual methods with which the target value is determined are irrelevant for the purposes of the invention and may, besides, be considered as known. Therefore, these methods will not be described in detail.

The control unit 20 processes the control signal using internal logics so as to determine and, consequently, emit the power supply signal corresponding to the target value, of which the control signal is descriptive.

Thus, in other words, the control unit 20 is configured to provide the power supply signal as a function of the control signal, so that the power supply signal provided corresponds to the target value for the required damping or actuating force.

Therefore, what has been described above defines a control chain, in particular an open-loop one, so that the control signal indicating the target value is used by the control unit 20 to determine and emit a power supply signal so that the electric motor 16 provides torque or a force transformed by the conversion assembly 18 into a damping or actuating force corresponding to the target value.

In other words, via the control chain, the damping or actuating force actually exerted by the shock absorber device 6 tends towards the target value, since the control unit 20 emits a power supply signal calibrated so that the torque or force provided by the electric motor 16 causes, via the conversion assembly 18, a damping or actuating force equal to the target value. In ideal conditions, the damping or actuating force will actually be equal to the target value. On the other hand, considering the non-ideal behaviour of the electric motor 16 and of the conversion assembly 18, the damping or actuating force will have a deviation from the target value, preferably negligible, although not necessarily.

Alternatively, the control unit 20 may comprise control logics in a closed loop to determine the power supply signal. In other words, the control unit 20 would emit the power supply signal as a function of a difference between the target value and the actual damping or actuating force, for example measured using a specific sensor or observed starting from one or more quantities measured using sensors. For example, the power supply signal could be proportional to the difference, or calculated according to a PID control law.

In the case of closed-loop control logics too, the control unit 20 would emit the power supply signal as a function of the control signal, so that the power supply signal corresponds or has a relation with the target value. In this case, the relation with the target value includes a dependence on the actual damping or actuating force contributing to form the difference or error.

For example, the shock absorber device 6 comprises a transducer, in particular a position transducer, more especially an encoder, configured to detect a quantity indicating a position of the shaft 13 in relation to the casing 10 and to generate a corresponding electric signal. The position transducer is electrically connected to the control unit 20, for example via the wire 26. Thus, the quantity detected is, specifically, indicative of the output speed from the electric motor 16. Therefore, the control unit 20 is configured to receive the electrical signal associated with the quantity detected.

For example, the damping or actuating force could potentially be observed by the control unit 20 starting from the electrical signal received, for example by making use of a stored mathematical model. The mathematical model would link the damping force to the dynamics of changing the position of the shaft 13. The mathematical model could be based on a theoretical model, on experimental data, or on both.

In FIG. 3, a wire identified by the reference number 28 is an additional, precautionary grounded wire, which is useful, for example, if there is a loss of insulation of the electric motor 16.

The control unit 20 preferably comprises a static power converter, in particular an inverter configured to convert direct current or a direct current signal into alternating current or an alternating current signal to supply the electric motor 16.

For example, the control unit 20 could comprise a logical block or logics configured to determine an additional control signal as a function of the control signal indicating the target value. The additional signal would be determined by the control unit 20 with a view to being converted into the power supply signal via the converter.

Therefore, the additional control signal would be calibrated so that the power supply signal from the conversion entailed that the power emitted by the electric motor 16 caused, via the conversion device 18, a damping or actuating force equal to the target value.

The additional control signal could even coincide with the control signal indicating the target value, without any loss of generality.

In detail, the control unit 20 adjusts the frequency of the power supply signal via the converter as a function of the control signal indicating the target value.

In other words, the control unit 20 comprises a mapping to map the target value onto the frequency of the power supply signal. Therefore, the frequency of the power supply signal is adjusted by the control unit 20 based on the mapping.

The mapping may be, for example, calibrated experimentally by associating the actual damping or actuating force exerted by the shock absorber device 6 or the damper 9 with the frequency of the power supply signal.

The control unit 20 is coupled to the spring support 7 in a fixed position relative to the spring support 7.

In particular, the coupling between the control unit 20 and the spring support 7 occurs using fastening elements, for example multiple screws.

The control unit 20 is, preferably, directly fixed to the spring support 7, i.e., in direct contact with the spring support 7.

The spring support 7 is, specifically, arranged between the spring 8 and the control unit 20 according to the axis K.

Figure 4:
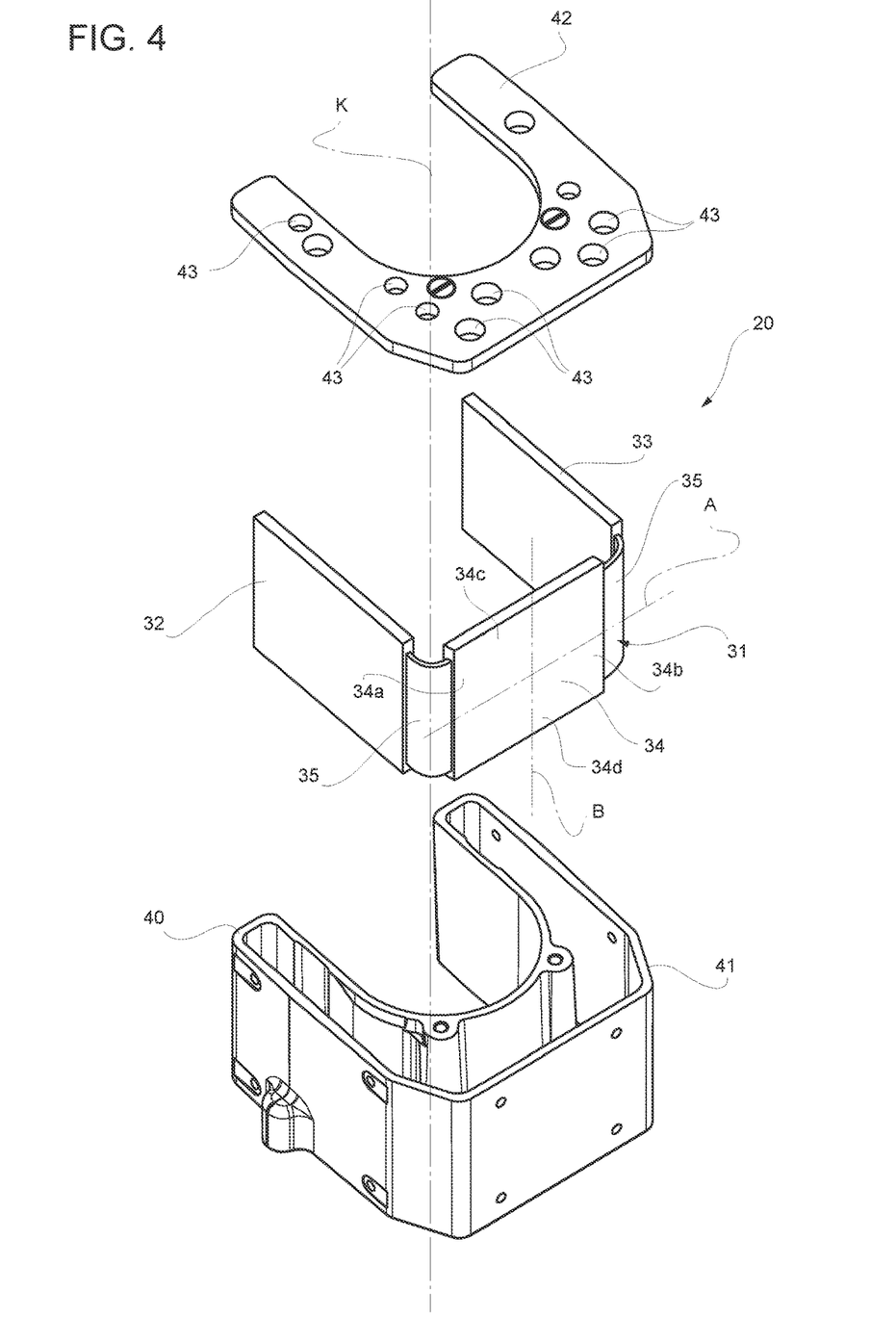
FIG. 4 is an exploded view, on an even more enlarged scale, of a control unit of the shock absorber device.

In addition, as can be seen better in FIG. 4, the control unit 20 comprises a printed circuit board 31 (otherwise known by the acronym PCB), which, in particular, defines the logics of the control unit 20.

The printed circuit board 31 comprises, preferably, at least three substantially rigid portions 32, 33, 34.

Each of the portions 32, 33, 34 extends transversely or orthogonally to corresponding axes orthogonal to the axis K. In addition, conveniently, the printed circuit board 31 comprises connect, two flexible portions 35 that respectively, the portions 32, 33 to the portion 34.

More specifically, the portion 34 has two opposite ends 34a, 34b according to a straight direction A, in particular transversal and more particularly orthogonal to the axis K. The portion 34 has another two opposite ends 34c, 34d according to an additional straight direction B orthogonal to the direction A and parallel to the axis K.

The portions 32, 33 are, respectively, coupled or connected to the portion 34 at the ends 34a, 34b via the flexible portions 35.

Despite the portions 32, 33, 34, 35 being distinct according to their differing flexibility, the printed circuit board 31 preferably consists of a single piece. Thus, the printed circuit board 31 is a single body, without interruptions, between the portions 32, 33, 34, 35.

The portions 32, 33 are arranged transversely to the portion 34 so as to form an empty volume between the portions 32, 33 according to the direction A.

More precisely, the portions 32, 33 are orthogonal to the portion 34. Thus, the printed circuit board 31 has a C- or U-shaped configuration. This particular configuration enables the control unit 20 to stay inscribed in the spring support 7 or, more precisely, in the diameter of the spring support 7, with dimensions advantageously compatible with the spaces of a suspension.

In other words, the portions 32, 33 are parallel or facing each other according to the direction A.

The casing 10 preferably traverses the empty volume between the portions 32, 33. In other words, the printed circuit board 31 embraces the casing 10.

The control unit 20 also comprises a casing 40 containing the printed circuit board 31.

The casing 40 has a shape corresponding to that of the printed circuit board 31.

More specifically, the casing 40 comprises a coating portion 41 defining a seat shaped to receive the printed circuit board 31 via insertion along the axis K only. In other words, the printed circuit board 31 cannot be inserted inside the seat along directions transversal to the axis K. In addition, the casing 40 comprises a mask 42 such as, for example, a cover configured to be fixed to the coating portion 41, for example using fastening elements such as screws, so as to close the printed circuit board 31 inside the seat. In other words, the printed circuit board 31 cannot be extracted from the seat when the mask 42 is fixed to the coating portion 41.

The mask 42 comprises a plate that is transversal and more precisely orthogonal to the axis K.

The coating portion 41 is arranged between the mask 42 and the spring support 7 according to the axis K.

The mask 42 has multiple through holes 43, in particular that have corresponding axes parallel to the axis K. The holes 43 are, respectively, traversed by the wires: 21, 22, 23, 24, 25, 26, 27, 28.

The wires 23, 24, 25, 26, 27, 28 end, in particular, with connection portions to be connected to the printed circuit board 31.

More specifically, at least one, some, or all of the connection portions are terminals directly fixed to the printed circuit board 31.

Inside the casing 40, the printed circuit board 31 is preferably immersed or embedded in a resin contained in the casing 40. For example, the resin is polymeric; more precisely, the resin is an epoxy resin.

The resin completely envelops the printed circuit board 31. In other words, the resin is present on both sides of the printed circuit board 31 according to directions orthogonal to the axis K.

The control unit 20 also preferably comprises a voltage-limiting element configured to limit the voltage of an electrical current directed by the electric motor 16 towards the motor vehicle 1 or, more precisely, towards the other control unit of the motor vehicle 1.

The control unit 20 is configured to activate the voltage-limiting element so that the latter performs its function of limiting voltage, when the same control unit 20 does not receive electrical supply current, in particular via the wire 24, nor the control signal indicating the target value of the damping force, in particular via the wire 27. In other words, the control unit 20 is configured to limit the voltage of an input electric current coming from the electric motor 16 when it does not receive either the supply current or the control signal indicating the target value of the damping or actuating force. For example, this happens when the movement of the suspension 4 generates a relative movement between the casing 10 and the shaft 13, thus generating a conducted rotation of the electric motor 16, which functions in this case as an electrical generator. From the above, the advantages of the shock absorber device 6 according to the invention are clear.

The shock absorber device 6 is extremely compact and, as a result, safe. The position of the control unit 20 near the spring support 7 enables the wires 21, 22, 23 to be very short compared to corresponding wires to connect the electric motor 16 to the other control unit of the motor vehicle 1. This enables the electrical insulation of the wires 21, 22, 23 and reduces the risks of short circuits or malfunctions. This aspect is particularly important since the wires 21, 22, 23 are designed for transporting the power supply signal of the electric motor 16, which is supplied with relatively high voltages.

The printed circuit board 31 has an optimal shape. In particular, the configuration with the three portions 32, 33, 34 and the flexible portions 35 enables the printed circuit board 31 to remain compact despite the relatively high number of components.

In addition, the C- or U-shaped configuration of the printed circuit board 31 facilitates the dispersion of heat via heat exchanges between the casing 40 and the surrounding air, in particular by convection, and between the casing 40 and the other casing 10, in particular via conduction, which, preferably, are both made of aluminium.

The resin wherein the printed circuit board 31 is embedded protects the printed circuit board 31 from the significant vibrations to which the shock absorber device 6 is subject. In addition, the resin constitutes an effective barrier against the infiltration of water and dust inside the casing 40.

Finally, it is clear that changes may be made to the shock absorber device 6 according to the invention, and variations produced thereof, that, in any case, do not depart from the scope of protection defined by the claims.

In particular, the number and shape of the components described and illustrated could be different to and, in particular, varied with great freedom.

In addition, each range described must be interpreted as multiple, individual alternative values. Each individual numeric value within the range must be considered as specifically described even if not explicitly mentioned.

Finally, the shock absorber device 6 may also be considered as belonging to the suspension 4 and, more generally, to the motor vehicle 1.

The invention claimed is:

1. A shock absorber device (6) for a motor vehicle (1), the shock absorber device (6) being configured to suspend a body (2) of the motor vehicle (1) relative to a suspension element (5) making part of the motor vehicle (1) and coupled to at least one wheel (3) of the motor vehicle (1), the shock absorber device (6) comprising
   a spring support (7),
   a spring (8) having an axis (K) and axially extending between a first axial end (8a) fixed to the spring support (7) and a second axial end (8b) to be fixed to the body (2),
   a damping device (9), which can be coupled to the wheel (3) and to the body (2) in order to damp a movement of the wheel (3) relative to the body (2) exerting a damping force in response to the movement of the wheel (3),
   a control unit (20),
   an electric motor (16) electrically connected to the control unit (20) and controllable by the control unit (20) through a power supply signal emitted by the control unit (20), such that the electric motor outputs a torque or a force corresponding to the power supply signal,
   conversion means (18) configured to control the damping device (9) turning the outputted torque or force into a further force corresponding to said torque or force and exerted by means of the damping device (9) upon the body (2),
   wherein the control unit (20) is configured to receive a first control signal indicative of a target value for the further force and to output the power supply signal as a function of the first control signal, such that the power supply signal corresponds to the target force for the further force, and
   wherein the control unit (20) is coupled to the spring support (7) in a fixed position relative to the spring support (7).

2. The shock absorber device according to claim 1, wherein the spring support (7) is axially arranged between the spring (8) and the control unit (20) along said axis (K).

3. The shock absorber device according to claim 1, wherein the control unit (20) is directly fixed to the spring support (7).

4. The shock absorber device according to claim 1, wherein the control unit (20) comprises logics configured to process the first control signal, thereby outputting a second control signal as a function of the first control signal, the control unit (20) further comprising a static power converter configured to convert the second control signal into the power supply signal.

5. The shock absorber device according to claim 1, wherein the control unit (20) comprises a printed circuit board (31).

6. The shock absorber device according to claim 5, wherein the printed circuit board (31) comprises a first portion (34) extending according to a straight direction (A) between two opposite ends (34a, 34b) of the first portion (34), two flexible portions (35) and two second portions (32, 33) respectively coupled to the opposite ends (34a, 34b) of the first portion (34) through the flexible portions (35), the second portions (32, 33) being arranged transversally relative to the first portion (34) so as to form an empty volume between the second portions (32, 33) according to the straight direction (A).

7. The shock absorber device according to claim 6, wherein the second portions (32, 33) are parallel to or face one another according to the straight direction (A).

8. The shock absorber device according to claim 6, wherein the straight direction (A) is orthogonal to said axis (K).

9. The shock absorber device according to claim 5, wherein the control unit (20) comprises a casing (40), in which the printed circuit board (31) is arranged, on the inside, embedded in a resin contained in the casing (40).

10. The shock absorber device according to claim 1, wherein the control unit (20) comprises an electrical connection (24, 25, 27) to receive a power supply current from a power source of the motor vehicle (1), the control unit (20) being configured to limit a voltage of an input electric current coming from the electric motor (16), when the control unit (20) does not receive either the power supply current or the first control signal.

11. The shock absorber device according to claim 1, wherein the damping device (9) comprises a casing (10) coaxial to the spring (8), the spring support (7) being fixed relative to the casing (10).

12. The shock absorber device according to claim 11, wherein the spring support (7) has a through hole along said axis (K), the through hole being completely crossed, along said axis (K), by the casing (10).

13. A motor vehicle comprising a body (2), a wheel (3), a suspension element (5) coupled to the wheel (3) and a shock absorber device (6) according to claim 1 suspending the body (2) relative to the suspension element (5), wherein the second axial end (8a) of the spring (8) is fixed to the body, and wherein the damping device (9) is coupled to the wheel (3) and to the body (2).

* * * * *